Patented Dec. 30, 1924.

1,521,560

UNITED STATES PATENT OFFICE.

CARL OECHSLIN, OF ABLON, FRANCE.

METHOD OF PREPARATION OF ALIPHATIC ARSENICAL DERIVATIVES FROM ACETO-ARSENIOUS ANHYDRIDE.

No Drawing.  Application filed September 14, 1922. Serial No. 588,183.

*To all whom it may concern:*

Be it known that I, CARL OECHSLIN, a citizen of the Swiss Confederation, and resident of Ablon, in the Republic of France, have invented a new and useful Method of Preparation of Aliphatic Arsenical Derivatives from Aceto-Arsenious Anhydride, of which the following is a specification.

A. Pictet and Bon have isolated the aceto-arsenious anhydride, $As(O_2CCH_3)_3$. (Bull. 33, p. 1139-1905.)

It has been ascertained that when heated at ordinary pressure, this product will be decomposed in a regular and substantially quantitative manner, with escape of carbon dioxide and distillation of acetic acid; there will remain a solid residue wherein the arsenic is combined with the carbon; $(AsCH)_x$. This reaction therefore constitutes a new method of introducing arsenic into an aliphatic body.

By oxidizing this product $(AsCH)_x$ there is obtained an arsenical acid which is but slightly soluble in water and alcohol and forming sodium salts which are very soluble in water and are precipitated by alcohol.

*Example.*—100 grams of arsenious acid are dissolved on the water bath in 150 grams of acetic anhydride by stirring. The addition of a very small quantity of sodium acetate may accelerate the solution to a very marked degree. When completely dissolved, the temperature is gradually raised to 180° C. and until the cessation of the escape of carbon dioxide and of the distillation of acetic acid. By producing a vacuum at the end of the operation, the mass will swell up, and becomes solid and friable. The substance is very finely powdered and extracted several times by caustic soda or dilute hydrochloric acid, and at the end of the operation this will afford a gray powder which is insoluble in most solvents and has the formula $(AsCH)_x$.

The said product is placed in suspension in a sodium carbonate solution, and the same is cooled and oxidized by hydrogen peroxide in slight excess; the whole of the substance becomes dissolved. When filtered through lampblack, the solution is colourless, and acidulation with hydrochloric acid will afford a precipitate of a white powder which is but slightly soluble in water and alcohol but is very soluble in the alkalis.

The formula for this body is $(HC:As.H_2O_2)_x$.

Having now particularly described and ascertained the nature of my said invention and in what manner the same is to be performed, I declare that what I claim is:

1. A method of preparation of an arsenical compound by the oxidation of the arsenical residue from the decomposition of aceto-arsenious anhydride.

2. A method of preparation of an arsenical compound having the formula $(HC:As.H_2O_2)_x$ which consists in treating arsenious acid with acetic anhydride, heating the mixture, and subsequently subjecting the product thus obtained, and having the formula $(As:CH)_x$, to the action of hydrogen peroxide.

In witness whereof I have hereunto signed my name.

CARL OECHSLIN.